United States Patent
Purica et al.

(10) Patent No.: US 12,198,033 B2
(45) Date of Patent: Jan. 14, 2025

(54) METHOD AND DEVICE FOR DETERMINING TRAJECTORIES OF MOBILE ELEMENTS

(71) Applicant: THALES, Courbevoie (FR)

(72) Inventors: Andrei Purica, Rungis (FR); Béatrice Pesquet, Rungis (FR); Nicolas Honore, Rungis (FR)

(73) Assignee: THALES, Courbevoie (FR)

( * ) Notice: Subject to any disclaimer, the term of this patent is extended or adjusted under 35 U.S.C. 154(b) by 1056 days.

(21) Appl. No.: 16/950,759

(22) Filed: Nov. 17, 2020

(65) Prior Publication Data

US 2021/0158128 A1 May 27, 2021

(30) Foreign Application Priority Data

Nov. 27, 2019 (FR) ...................................... 1913277

(51) Int. Cl.
*G06N 3/045* (2023.01)
*G01S 13/87* (2006.01)
*G06N 20/00* (2019.01)

(52) U.S. Cl.
CPC .............. *G06N 3/045* (2023.01); *G01S 13/87* (2013.01); *G06N 20/00* (2019.01)

(58) Field of Classification Search
CPC ........ G01S 13/87; G01S 5/0027; G01S 13/91; G01S 19/42; G06N 3/045; G06N 20/00; G06N 20/10; G08G 5/0013; G08G 5/0026; G08G 5/0082; G06F 17/18; G06F 18/241

See application file for complete search history.

(56) References Cited

U.S. PATENT DOCUMENTS

| | | |
|---|---|---|
| 2008/0111731 A1 | 5/2008 | Hubbard et al. |
| 2013/0229298 A1 | 9/2013 | Eckstein et al. |
| 2017/0249547 A1* | 8/2017 | Shrikumar ............ G06N 3/045 |
| 2018/0056800 A1* | 3/2018 | Meichle ................ B60L 53/305 |

* cited by examiner

*Primary Examiner* — Lisa M Caputo
*Assistant Examiner* — Cynthia L Davis
(74) *Attorney, Agent, or Firm* — BakerHostetler

(57) ABSTRACT

A method for determining the trajectory of at least one mobile element from position data, includes an initial step consisting in classifying a set of positions relating to at least one detected mobile element by applying a first data classification algorithm to the set of positions, which provides an initial trajectory relating to each detected mobile element. The method comprises the following steps, implemented on each current observation window: classifying each new position detected in at least one trajectory by applying a second data classification algorithm; identifying, for each detected mobile element, the positions relating to the detected mobile element; determining an intermediate complete trajectory for each detected mobile element; determining a final complete trajectory for each detected mobile element.

12 Claims, 2 Drawing Sheets

METHOD AND DEVICE FOR DETERMINING TRAJECTORIES OF MOBILE ELEMENTS

CROSS-REFERENCE TO RELATED APPLICATIONS

This application claims priority to foreign French patent application No. FR 1913277, filed on Nov. 27, 2019, the disclosure of which is incorporated by reference in its entirety.

FIELD OF THE INVENTION

The invention relates generally to the systems for monitoring and, in particular, determining trajectories of mobile elements from position data originating from a plurality of positioning data sources.

BACKGROUND

Detecting, tracking and analysing the movement of mobile elements (objects or bodies) constitute methods that are essential to the implementation of various applications, such as navigation, monitoring or security applications.

In particular, the monitoring systems use devices which make it possible to position elements that are in motion. Such devices comprise, for example, embedded position sensors, (road, rail and air) radars, and satellite location or positioning systems (for example, the GPS system or "Global Positioning System"). The position data supplied by these devices are processed and analysed in order to detect and track the movement of target elements in time.

The (absolute or relative) movement of an element in motion is characterized by the trajectory of the element and by the trend of the speed of the element in time. The trajectory of an element in motion represents the set of successive positions occupied by the element over time. The trajectory represents one of the means most widely used in monitoring systems to describe the activity of an element under monitoring.

The estimation of the trajectory of an element in motion is conventionally performed using a Kalman filter, according to different variants. The Kalman filter is a recursive tool defined by a set of (linear or nonlinear) equations for estimating the state of a system. In applications for detecting and tracking elements in motion, the Kalman filter makes it possible to determine the position, the speed, and the acceleration of an element in motion. The Kalman filter is used to estimate the trajectory of a mobile element by estimating, iteratively, the position of the mobile element. On each iteration, the Kalman filter estimates a position at the current instant from the position observed at the preceding instant corresponding to the preceding iteration. A correction step follows the estimation step to correct the predicted position by using the current measurement.

Although the techniques for estimating trajectories based on Kalman filtering make it possible to detect and track the mobile elements and to create complete trajectories describing the activity of the mobile elements over time, these techniques do present limitations. Indeed, the Kalman filters require intensive processing and computation time, which means that mobiles elements cannot be tracked in real time. Moreover, they entail a considerable latency to be able to obtain complete and smooth trajectories. Furthermore, the construction of complete trajectories by using Kalman filters is done by integrating, one by one, the plots of trajectories in order to separate the false trajectories from those which correspond to the target trajectories relating to target elements. Such a construction process involves a significant processing time, which limits the implementation of such techniques in the monitoring systems applied to monitoring and security applications in which processing within a very short time or in real time is of prime importance. To these limitations is added the suboptimality of the techniques based on Kalman filtering in terms of processing, of merging and of interpolation of the positions originating from different positioning data sources.

There is therefore a need for an enhanced device and an enhanced method for determining trajectories of a mobile element from position data originating from multiple positioning data sources that have reduced processing and computation times.

SUMMARY OF THE INVENTION

The invention does improve the situation. To this end, the invention proposes a method for determining the trajectory of at least one mobile element from position data originating from a plurality of positioning data sources, implemented according to a sliding observation window. The method is characterized in that it comprises an initial step consisting in classifying a set of positions relating to at least one detected mobile element by applying a first data classification algorithm to said set of positions, which provides an initial trajectory relating to each detected mobile element, and in that it comprises the following steps, implemented on each current observation window:
classifying each new detected position relating to at least one detected mobile element received during the current observation window in at least one trajectory by applying a second data classification algorithm;
identifying, for each detected mobile element, the positions relating to the detected mobile element from among the set of positions and the new detected positions received during the observation window;
determining an intermediate complete trajectory for each detected mobile element by applying an interpolation algorithm to at least one trajectory relating to the detected mobile element and to all the positions relating to the detected element;
determining a final complete trajectory for each detected mobile element from the intermediate complete trajectory relating to said each detected mobile element by applying an algorithm that can eliminate, from the intermediate complete trajectory, the positions that do not relate to said detected mobile element.

According to certain embodiments, the first data classification algorithm can be a machine learning algorithm.

According to certain embodiments, the machine leaning algorithm can be a supervised machine learning algorithm comprising a learning phase, the learning phase using, as learning data, the position data originating from a plurality of positioning data sources and at least one predetermined trajectory in relation to at least one detected mobile element.

According to certain embodiments, the supervised machine learning algorithm can be chosen from a group comprising support vector machines (SVMs), linear regression, logistical regression, random forests, decision trees, nearest neighbour algorithms, neural networks and learning through similarity.

According to certain embodiments, the supervised learning algorithm can be an algorithm with a number of variable inputs and a number of fixed outputs combining a neural network entirely connected with a one-dimensional convolutional neural network.

According to certain embodiments, a new detected position received can be classified in the initial trajectory relating to a detected mobile element if the new detected position received relates to one of the detected mobile elements, the new detected position received being classified in a new trajectory if the new detected position received does not relate to a detected mobile element.

According to certain embodiments, the second data classification algorithm can be a machine learning algorithm.

According to certain embodiments, the interpolation algorithm can be a machine learning algorithm.

According to certain embodiments, the interpolation algorithm can be an algorithm with a number of variable inputs and a number of variable outputs combining a neural network entirely connected with a one-dimensional convolutional neural network.

According to certain embodiments, the algorithm capable of eliminating the positions relating to the detected mobile element can be a supervised machine learning algorithm.

According to certain embodiments, the algorithm can use, as learning data, the position data originating from a plurality of positioning data sources, the intermediate complete trajectories and the classification of each new detected position received during a current observation window.

According to certain embodiments, the algorithm can use, as learning data, one or more predetermined trajectories in relation to at least one detected mobile element.

Advantageously, the embodiments of the invention provide a method and a device for determining complete trajectories of at least one mobile element from position data originating from different positioning data sources by allowing the merging and the interpolation of these different data and the determination of smooth and reliable complete trajectories within a short time.

Advantageously, the embodiments of the invention make it possible to determine the trajectory of at least one mobile element with a high accuracy of the interpolated positions and a good regularity of the trajectories.

The embodiments of the invention also provide machine learning algorithms capable of learning raw position data originating from a plurality of positioning data sources in order to determine complete, smooth and regular trajectories with a response time and a time resolution shorter than those required in the current systems implementing intensive and unreliable computations.

Advantageously, the embodiments of the invention implement machine learning algorithms and models for the classification of the position data and the interpolation of the partial trajectories by linking them reliably in a single complete trajectory.

The machine learning algorithms according to the different embodiments of the invention also make it possible to merge and interpolate different raw position data and a multitude of plots originating from different positioning data sources in a monitoring system.

BRIEF DESCRIPTION OF THE DRAWINGS

Other features and advantages of the invention will become apparent from the following description given with reference to the attached drawings, given by way of example, and which represent, respectively.

DETAILED DESCRIPTION

The embodiments of the invention provide a method and a device for determining the complete trajectory of at least one mobile element from position data originating from a plurality of positioning data sources.

As used here, a mobile element refers to a mobile object or a mobile body.

A mobile object can for example be an object in motion on the ground, in the air, or in a marine environment. Examples of mobile objects include road vehicles, mobile smart transport stations (e.g. connected cars), rail cars, marine craft, robots, aircraft (e.g. aeroplane, helicopter, hot air balloon, drone), etc. Such objects can be deployed in various applications such as smart transport systems implementing connected vehicles and mobile roadside stations for communication between vehicles and between vehicles and the infrastructure, the internet of things, and the control of road or rail or air or sea traffic.

A mobile body can be a mobile person or a mobile animal body whose movement is tracked, for example for monitoring purposes (e.g. remote medical assistance, driver monitoring) or safety purposes (e.g. pedestrian navigation, road safety).

The position data from a mobile element according to the embodiments of the invention originate from a plurality of positioning data sources. The position data can comprise:
  position data acquired by analogue position sensors (e.g. potentiometer) or digital position sensors embedded in a mobile element;
  satellite geolocation data (e.g. GPS data) calculated by a satellite signal receiver (e.g. GPS receiver) and transmitted to a data recorder;
  data originating from a road monitoring radar (radar fixed or embedded in a mobile road vehicle);
  data originating from an air traffic control radar (e.g. primary radars, secondary radars);
  data originating from a railway radar (e.g. level crossing radar and general crossing radars);
  data originating from a multilateration system composed of several beacons which receive the signals emitted by the transponder of an aeroplane to locate it;
  position data determined according to the ADS C system (ADS C being the acronym for 'Automatic Dependant Surveillance-Contract') in which an aeroplane uses its satellite or inertial navigation systems to automatically determine and transmit its position to a processing centre;
  position data determined according to an ADS B system (ADS B being the acronym for 'Automatic Dependant Surveillance-Broadcast') in which an aeroplane uses its satellite or inertial navigation systems to automatically determine and broadcast its position and other information such as the speed and the flight designator.

Figure 1:
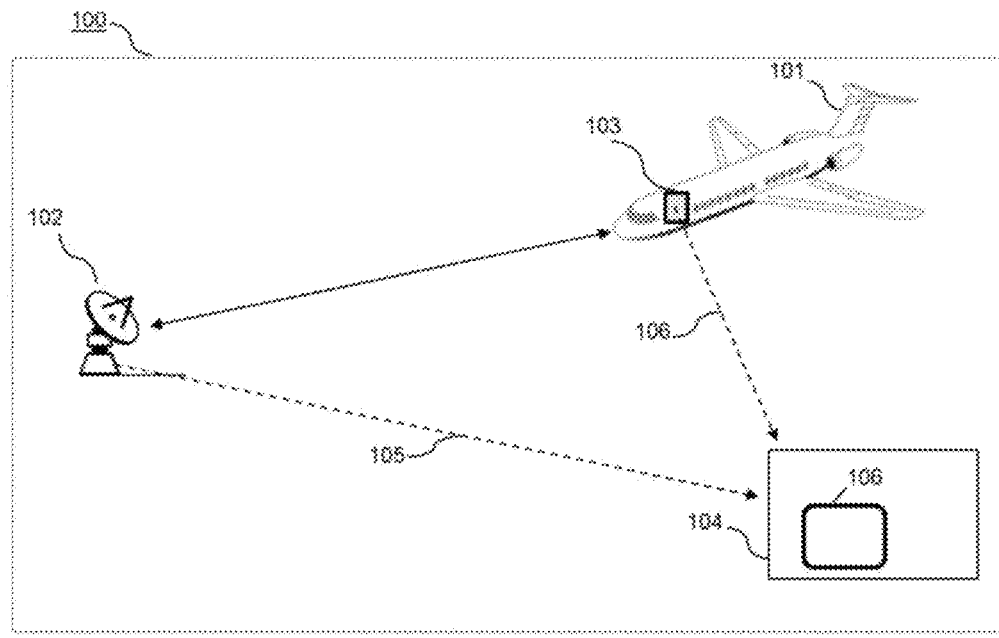
FIG. 1 is a diagram representing an example of application of the invention to a monitoring system, according to certain embodiments of the invention.

FIG. 1 represents an example of an environment in which a device and a method for determining the trajectory of at least one mobile element from position data originating from a plurality of positioning data sources in a monitoring system 100 can be used.

The embodiments of the invention can be used in various systems comprising, by way of nonlimiting examples:

navigation systems of all types of vehicles (e.g. cars, trucks, buses, motorbikes, agricultural machinery, trains, aircraft, ships) for the management of road traffic, the management of rail traffic, the management of maritime traffic, the management of air traffic, the detection of speed violations, and for game activities such as the practice of hiking or cycling;

monitoring systems, for example for monitoring borders and secure sites, monitoring public places, assistance to people;

security systems, for example for controlling access to private sites, analysing the behaviour of people in public places (e.g. airports, shopping centres, etc.).

According to certain embodiments, the monitoring system 100 can be an air traffic control system put in place to control the real traffic involving at least one mobile aircraft 101. The monitoring system 100 can be configured to ensure the tracking of the trajectory of the aircraft 100 based at least on position data 105 originating from a radar 102 (primary or secondary) and on position data 106 transmitted by the aircraft 101 (e.g. data originating from satellite geolocation data calculated by a receiver 103, data originating from an ADS-C system, or data originating from an ADS-B system). These position data can be communicated to a processing centre 104 configured to process and analyse these position data for air traffic control and management purposes in the monitoring system 100.

The embodiments of the invention provide a device 106 for determining the trajectory of at least one mobile element from position data originating from a plurality of positioning data sources. In the embodiment of FIG. 1, the device 106 is implemented at the processing centre 104 of a monitoring system 100 to determine the trajectory of at least one aircraft 101.

Figure 2:
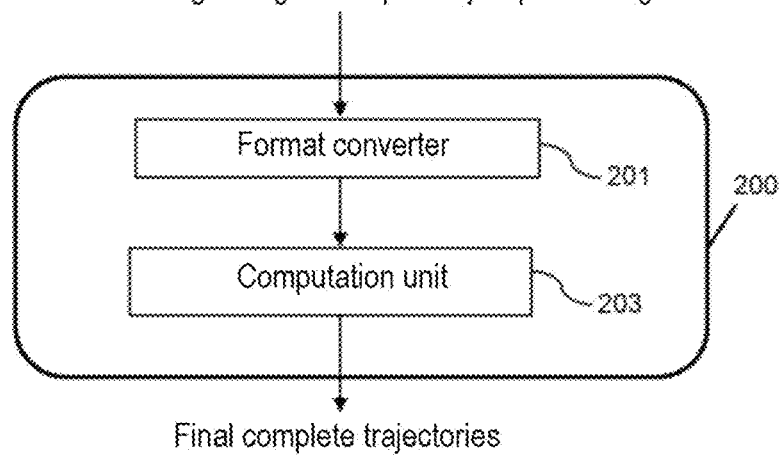
FIG. 2 is a diagram representing an example of block architecture of a device for determining the complete trajectory of at least one mobile element from position data originating from a plurality of positioning data sources, according to certain embodiments of the invention.

FIG. 2 is a diagram representing a device 106 for determining the trajectory of at least one mobile element from position data originating from a plurality of data sources, according to certain embodiments of the invention.

The position data originating from a plurality of positioning data sources can have different formats. The device 106 can comprise a format converter 201 configured to convert the raw position data received into one and the same data format. A converted position datum (also called 'position datum') indicates the position of a mobile element according to the axes x, y and z corresponding respectively to a longitude, a latitude, and an altitude, and a time value representing the time (coordinated universal time).

From these position data, the device 106 is configured to determine a final complete trajectory for each detected mobile element according to a continuous processing with sliding observation window.

According to certain embodiments, the device 106 can comprise a computation unit 203 configured to continually receive the position data originating from a plurality of positioning data sources.

According to certain embodiments, the computation unit 203 can be configured, during an initialization phase, to classify a given number of positions relating to at least one detected mobile element by applying a first data classification algorithm to the given number of positions, which provides an initial trajectory relating to each detected mobile element. The computation unit 203 can also be configured to execute a continuous processing with sliding observation window to determine, on each current observation window, a complete trajectory for each detected mobile element. More specifically, the computation unit 203 can be configured, in each current observation window, to:

classify each new detected position received during the current observation window in at least one trajectory by applying a second data classification algorithm;

determine, for each detected mobile element, all the positions relating to the detected mobile element out of the given number of positions relating to at least one detected mobile element and the new detected positions received during the current observation window;

determine an intermediate complete trajectory for each detected mobile element by applying an interpolation algorithm to at least one trajectory relating to the detected mobile element and to all the positions relating to the detected mobile element, and determine a final complete trajectory for each detected mobile element from the intermediate complete trajectory relating to each detected mobile element by applying an algorithm that can eliminate, from the intermediate complete trajectory, the positions that do not relate to the detected mobile element.

According to certain embodiments, the first data classification algorithm can be a machine learning algorithm.

According to one embodiment, the first data classification algorithm can be a supervised machine learning algorithm which associates input data with data predicted using a determined function from tagged learning data.

According to certain embodiments in which the first classification algorithm is a supervised machine learning algorithm, the first algorithm can be trained during the learning phase by using, as learning data, the position data originating from the multiple positioning data sources and at least one predetermined trajectory. The at least one predetermined trajectory can be a partial trajectory predetermined for example by a software or hardware component configured to calculate trajectories from position data, or a predetermined complete trajectory.

According to certain embodiments, the choice of the given number of positions can be made to address specifications or requirements in terms of performance of the algorithm implemented to perform the data classification. According to these embodiments, the initialization phase, during which the computation unit 203 is configured to classify a given number of positions relating to at least one detected mobile element, can be associated with a classification error, the given number of positions relating to at least one detected mobile element being predetermined in such a way that the classification error lies within a predefined confidence interval. The confidence interval makes it possible to quantity and estimate the uncertainty of an estimation performed by the machine learning algorithm.

According to certain embodiments, the first classification algorithm can be a supervised machine learning algorithm chosen from a group comprising, without limitations, support vector machines (SVMs), linear regression, logistical regression, random forests, decision trees, nearest neighbour algorithms, neural networks, and learning through similarity.

According to one embodiment, the first data classification algorithm can be a supervised learning algorithm with a number of variable inputs and a number of fixed outputs combining a neural network entirely connected with a one-dimensional convolutional neural network.

According to certain embodiments, the computation unit 203 can be configured to classify each new detected position received in the initial trajectory relating to a detected mobile element if the new detected position received relates to one of the at least one detected mobile element for which an initial trajectory has been determined in the initialization phase, the computation unit 203 being configured to classify the new detected position received in a new trajectory if the new detected position received does not relate to a detected mobile element. In this case, this position indicates the presence of a new mobile element in the zone monitored in a monitoring system.

According to certain embodiments, the second data classification algorithm can be a machine learning algorithm.

According to certain embodiments, the interpolation algorithm can be a machine learning algorithm.

In one embodiment, the interpolation algorithm can be a supervised machine learning algorithm with a number of variable inputs and a number of variable outputs combining a neural network entirely connected with a one-dimensional convolutional neural network.

According to another embodiment, the interpolation algorithm can be a machine learning algorithm of random forests type.

According to certain embodiments, the algorithm capable of eliminating the positions relating to the detected mobile element can be a supervised machine learning algorithm. In particular, the algorithm can use, as learning data, the position data originating from the plurality of positioning data sources, the intermediate complete trajectories determined by applying the interpolation algorithm, and the classification of each new detected position received during a current observation window by applying the second data classification algorithm. The algorithm makes it possible to eliminate the stationary and mobile objects which are different from the tracked or target mobile elements.

According to certain embodiments in which the algorithm capable of eliminating the positions relating to the detected mobile element is a supervised machine learning algorithm, the algorithm can use, as learning data, one or more predetermined trajectories in relation to at least one detected mobile element.

Figure 3:
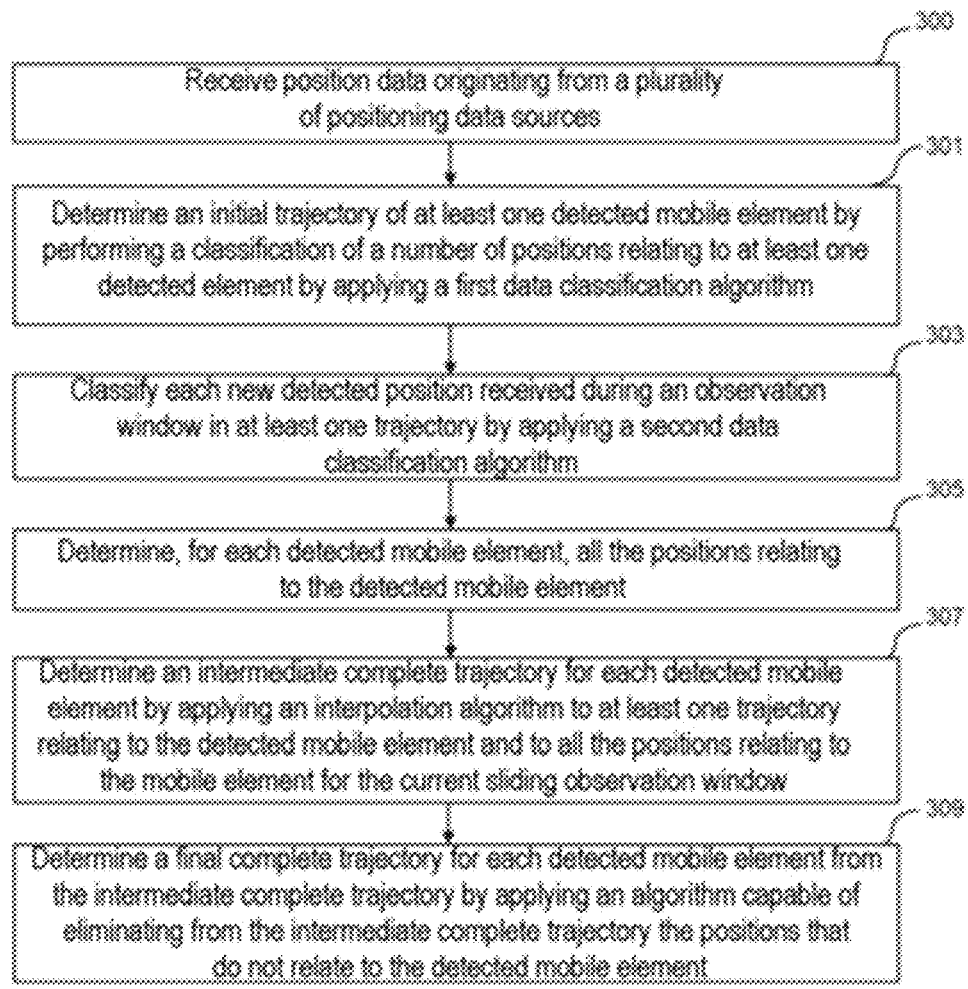
FIG. 3 is a flow diagram representing a method for determining the complete trajectory of at least one mobile element from position data originating from a plurality of positioning data sources, according to certain embodiments of the invention.

Referring to FIG. 3, the embodiments of the invention also provide a method for determining the trajectory of at least one mobile element from position data originating from a plurality of positioning data sources. The method according to the invention can comprise an initialization phase and a continuous processing based on sliding observation window to determine, continually and in almost real time, a complete trajectory for at least one detected mobile element.

In the step 300, position data originating from a plurality of positioning data sources can be received. The step 300 can comprise a substep of conversion of the received position data into one and the same data format when the position data originating from a multitude of positioning data sources have different formats.

In the step 301, an initial trajectory of at least one detected mobile element can be determined by classifying a given number of positions relating to at least one detected mobile element, the classification of the given number of positions relating to at least one detected mobile element being performed by applying a first data classification algorithm to the given number of positions relating to at least one detected mobile element.

According to certain embodiments, the first data classification algorithm can be a machine learning algorithm.

According to one embodiment, the first data classification algorithm can be a supervised machine learning algorithm which associates input data with data predicted using a determined function from tagged learning data.

According to certain embodiments in which the first classification algorithm is a supervised machine learning algorithm, the first algorithm can be trained during the learning phase by using, as learning data, the position data originating from the multiple positioning data sources and at least one predetermined trajectory. The at least one predetermined trajectory can be a partial trajectory predetermined for example by a software or hardware component configured to calculate trajectories from position data, or a predetermined complete trajectory.

According to certain embodiments, the choice of the given number of positions can be made to address specifications or requirements in terms of performance of the algorithm implemented to perform the data classification. According to these embodiments, the initialization phase of the step 301, during which a given number of positions relating to at least one detected mobile element is classified, can be associated with a classification error, the given number of positions relating to at least one detected mobile element being predetermined in such a way that the classification error lies within a predefined confidence interval. The confidence interval makes is possible to quantify and estimate the uncertainty of an estimation performed by the machine learning algorithm.

According to certain embodiments, the first classification algorithm can be a supervised machine learning algorithm chosen from the group comprising, without limitations, support vector machines (SVMs), linear regression. logistical regression, random forests, decision trees, nearest neighbour algorithms, neural networks, and learning though similarity.

According to one embodiment, the first data classification algorithm can be a supervised learning algorithm with a number of variable inputs and a number of fixed outputs combining a neural network entirely connected with a one-dimensional convolutional neural network.

The method according to the invention can comprise a continuous processing with sliding observation window, the steps 303 to 309 corresponding to the processing performed on each current observation window.

In step the 303 of each sliding observation window, each new detected position received during the current observation window can be classified in at least one trajectory by applying a second data classification algorithm.

According to certain embodiments, a new detected position received can be classified in the initial trajectory relating to a detected mobile element if the new detected position received relates to one of the at least one detected mobile element for which an initial trajectory has been determined in the initialization phase, or else, a new detected position received can be classified in a new trajectory if the new detected position received does not relate to a detected mobile element.

According to certain embodiments, the second data classification algorithm can be a machine learning algorithm.

In the step 305, all the positions relating to each detected mobile element out of the given number of positions relating to at least one detected mobile element and the new detected positions received during the current observation window can be determined.

In the step 307, an intermediate complete trajectory can be determined for each detected mobile element by applying an interpolation algorithm to at least one trajectory relating to the detected mobile element and to all the positions relating to the detected mobile element.

According to certain embodiments, the interpolation algorithm can be a machine learning algorithm.

According to certain embodiments, the interpolation algorithm can be a supervised machine learning algorithm with a number of variable inputs and a number of variable outputs combining a neural network entirely connected with a one-dimensional convolutional neural network.

According to certain embodiments, the interpolation algorithm can be a machine learning algorithm of random forests type.

In the step 309, a final complete trajectory can be determined for each detected mobile element from the intermediate complete trajectory relating to the detected mobile element by applying an algorithm capable of eliminating, from the intermediate complete trajectory, the positions that do not relate to the detected mobile element.

According to certain embodiments, the algorithm capable of eliminating the positions relating to the detected mobile element can be a supervised machine learning algorithm.

According to certain embodiments, the algorithm capable of eliminating the positions that do not relate to the detected mobile element can use, as learning data, the position data originating from the plurality of positioning data sources, the intermediate complete trajectories determined by applying the interpolation algorithm, and the classification of each new detected position received during a current observation window by applying the second data classification algorithm. The algorithm makes it possible to eliminate the stationary and mobile objects which are different from the tracked or target mobile elements.

According to certain embodiments, the algorithm capable of eliminating the positions that do not relate to the detected mobile element can use, as learning data, one or more predetermined trajectories in relation to at least one detected mobile element.

The invention also provides a computer program product comprising code instructions making it possible to perform the steps of the method when said program is run on a computer.

The device 106, the method and the computer program product for determining the trajectory of mobile elements from position data originating from a plurality of positioning data sources according to the different embodiments of the invention can be implemented on one or more devices or computer systems. Generally, the routines executed to implement the embodiments of the invention, whether implemented in the context of an operating system or of a specific application, of a component, of a program, of an object, of a module or of a sequence of instructions, or even of a subset thereof, can be designated herein as "computer program code" or simply "program code". The program code typically comprises computer-readable instructions which reside at various moments in various memory and storage devices in a computer and which, when they are read and executed by one or more processors in a computer, cause the computer to perform the operations necessary to execute the operations and/or the elements specific to the various aspects of the embodiments of the invention. The instructions of a program, readable by computer, to perform the operations of the embodiments of the invention, can be, for example, the assembly language, or even a source code or an object code written in combination with one or one programming languages.

The invention claimed is:

1. A method implemented in an air traffic control system for air traffic control involving at least one mobile aircraft, the method comprising:
determining a trajectory of at least one mobile aircraft from position data originating from a plurality of positioning data sources said position data comprising position data provided by a radar and position data transmitted by said at least one mobile aircraft, wherein the method is implemented according to a continuous processing using a sliding observation window, wherein the method comprising receiving continuously position data from the plurality of positioning data sources, the method comprising an initial step, implemented by a computation unit in a device, consisting in classifying a set of positions relating to at least one detected mobile aircraft by applying a first data classification algorithm to said set of positions, which provides an initial trajectory relating to each detected mobile aircraft, the first data classification algorithm being a machine learning algorithm, the first data classification algorithm being trained during a training phase using, as learning data, the position data from said plurality of positioning data sources and at least one predetermined trajectory, and in that the method further comprises the following steps, implemented on each current observation window:
classifying, by the computation unit, each new detected position relating to at least one detected mobile aircraft received during said current observation window in at least one trajectory by applying a second data classification algorithm, the second data classification algorithm being a machine learning algorithm, a new detected position being classified in said initial trajectory if the new detected position is related to one of said at least one mobile aircraft for which the initial trajectory has been determined or otherwise in a new trajectory;
identifying, by the computation unit, for each detected mobile aircraft, the positions relating to said detected mobile aircraft out of said set of positions and the new detected positions received during said observation window;
determining, by the computation unit, an intermediate complete trajectory for each detected mobile aircraft by applying an interpolation algorithm to at least one trajectory relating to said detected mobile aircraft and to all the positions relating to said detected mobile aircraft; and
determining, by the computation unit, a final complete trajectory for each detected mobile aircraft from the intermediate complete trajectory relating to said each detected mobile aircraft by applying a machine learning algorithm that eliminates from said intermediate complete trajectory the positions that do not relate to said detected mobile aircraft,
wherein said interpolation algorithm is a supervised machine learning algorithm with a number of variable inputs and a number of variable outputs combining a neural network entirely connected with a one-dimensional convolutional neural network, and
wherein the method further comprises using said determined complete trajectory for the air traffic control.

2. The method according to claim 1, wherein said first data classification algorithm is a supervised machine learning algorithm which associates input data to predicted data using a function determined form tagged learning data.

3. The method according to claim 1, wherein said first data classification algorithm is a supervised machine learning algorithm chosen from a group comprising support vector machines (SVMs), linear regression, logistical regression, random forests, decision trees, nearest neighbour algorithms, neural networks, and learning through similarity.

4. The method according to claim 1, wherein said first algorithm is a supervised machine learning algorithm with a number of variable inputs and a number of fixed outputs combining a neural network entirely connected with a one-dimensional convolutional neural network.

5. The method according to claim 1, wherein said algorithm that eliminates positions relating to the detected mobile aircraft is a supervised machine learning algorithm.

6. The method according to claim 5, wherein said algorithm that eliminates positions relating to the detected mobile aircraft uses, as learning data, the position data originating from a plurality of positioning data sources, the intermediate complete trajectories and the classification of each new detected position received during a current observation window.

7. The method according to claim 5, wherein said algorithm that eliminates positions relating to the detected mobile aircraft uses, as learning data, one or more predetermined trajectories in relation to at least one detected mobile aircraft.

8. The method of claim 1, wherein an initialization phase is associated with a classification error, a given number of position data related to at least detected mobile aircraft being classified during the initialization phase, said given number of position data being predetermined so that the classification error is comprised in a predefined confidence interval.

9. The method of claim 1, wherein said predetermined trajectory is a partial trajectory determined by a component configured to compute the trajectories from position data.

10. The method of claim 1, wherein it the method further comprises converting the position data received from the plurality of positioning data sources in a same data format.

11. The method of claim 10 wherein a converted position data indicates the position of a mobile aircraft according to axes, corresponding to a longitude, latitude, and an altitude, as well as a time value representing the time.

12. A traffic control system involving at least one mobile aircraft, comprising:
a device for determining a trajectory of at least one mobile aircraft from position data originating from a plurality of positioning data sources, said position data comprising position data provided by a radar and position data transmitted by said at least one mobile aircraft, wherein the device comprises a computation unit implementing a continuous processing using a sliding observation window, the computation unit being configured to continuously receive position data from the plurality of positioning data sources, the computation unit being configured to classify, during an initial phase, a set of positions relating to at least one detected mobile aircraft by applying a first data classification algorithm to said set of positions, which provides an initial trajectory relating to each detected mobile aircraft, the first data classification algorithm being a machine learning algorithm, the first data classification algorithm being trained during a training phase using, as learning data, the position data from said plurality of positioning data sources and at least one predetermined trajectory, and in that, in each current observation window, the computation unit is configured to:
classify each new detected position relating to at least one detected mobile aircraft received during said current observation window in at least one trajectory by applying a second data classification algorithm, the second data classification algorithm being a machine learning algorithm, a new detected position being classified in said initial trajectory if the new detected position is related to one of said at least one mobile aircraft for which the initial trajectory has been determined or otherwise in a new trajectory;
identify for each detected mobile aircraft, the positions relating to said detected mobile aircraft out of said set of positions and the new detected positions received during said observation window;
determine an intermediate complete trajectory for each detected mobile aircraft by applying an interpolation algorithm to at least one trajectory relating to said detected mobile aircraft and to all the positions relating to said detected mobile aircraft; and
determine a final complete trajectory for each detected mobile aircraft from the intermediate complete trajectory relating to said each detected mobile aircraft by applying a machine learning algorithm that eliminates from said intermediate complete trajectory the positions that do not relate to said detected mobile aircraft,
wherein said interpolation algorithm is a supervised machine learning algorithm with a number of variable inputs and a number of variable outputs combining a neural network entirely connected with a one-dimensional convolutional neural network, and
wherein the traffic control system is configured to use said determined complete trajectory for traffic control involving the at least one mobile aircraft.

* * * * *